United States Patent [19]

Nelson et al.

[11] Patent Number: 5,686,671
[45] Date of Patent: Nov. 11, 1997

[54] GRAIN MASS FLOW SENSOR FOR AN AGRICULTURAL COMBINE

[75] Inventors: Frederick William Nelson; Wayne Farrior Smith, both of Moline; Kent Robert Hawk, Erie, all of Ill.; Terence Daniel Pickett, Bluegrass; James Joseph Phelan, Bettendorf, both of Iowa; Gregory Craig Eckart, Southington, Conn.

[73] Assignee: Deere & Company, Moline, Ill.

[21] Appl. No.: 710,128

[22] Filed: Sep. 11, 1996

Related U.S. Application Data

[62] Division of Ser. No. 526,675, Sep. 11, 1995.
[51] Int. Cl.[6] ........................................... G01F 1/30
[52] U.S. Cl. ........................................... 73/861.73
[58] Field of Search ........................... 73/861.73, 861.72

[56] References Cited

U.S. PATENT DOCUMENTS

| | | | |
|---|---|---|---|
| 4,765,190 | 8/1988 | Strubbe | 73/861.72 |
| 5,343,761 | 9/1994 | Myers | 73/861.73 |

*Primary Examiner*—Richard Chilcot
*Assistant Examiner*—Jewel V. Artis

[57] ABSTRACT

A mass flow sensor for a combine is positioned in the transition housing between the paddle elevator of the clean grain elevator and the loading auger of the clean grain tank. The mass flow sensor comprises an impact plate having an arm which is axially aligned with the predominant grain flow from the paddle elevator. The arm is coupled to a force measuring assembly having a potentiometer for generating an electric signal that is proportional to impact force.

11 Claims, 3 Drawing Sheets

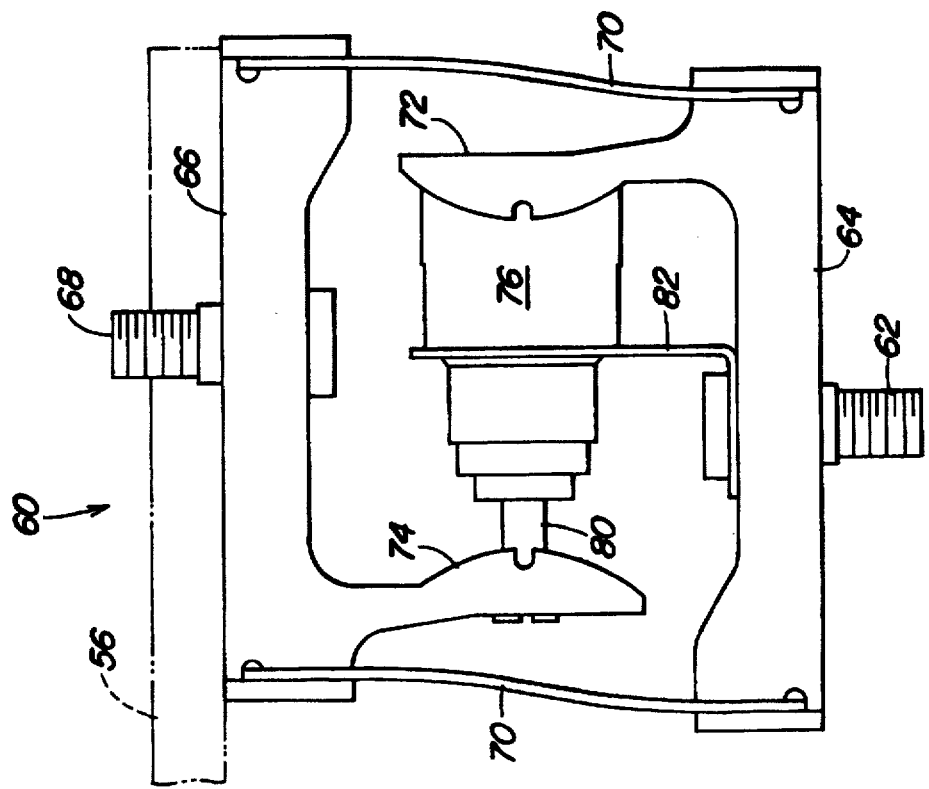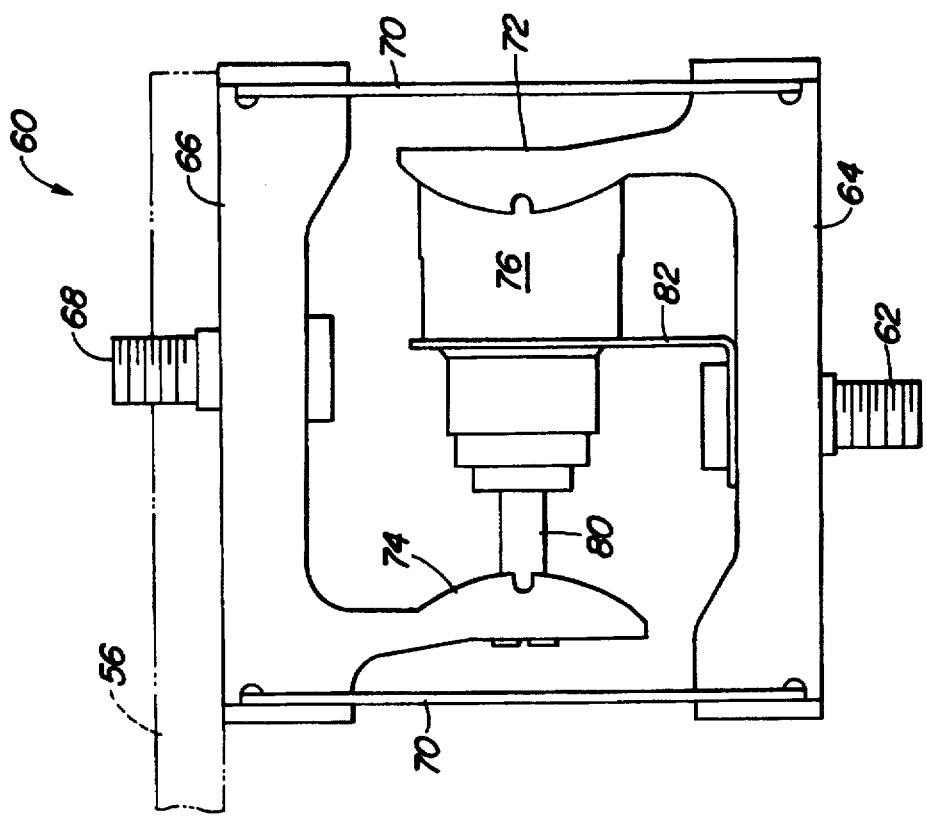

GRAIN MASS FLOW SENSOR FOR AN AGRICULTURAL COMBINE

This application is a division of application Ser. No. 08/526,675, filed Sep. 11, 1995.

BACKGROUND OF THE INVENTION

1. Field of the Invention

The invention is directed to a grain mass flow sensor for an agricultural combine wherein an impact plate is positioned so that its line of action is substantially coincident with the predominant direction of grain flow.

2. Description of the Prior Art

Precision farming uses Global Positioning Satellites (GPS) to determine the exact location of a agricultural machine in the field. The machine is fitted with a receiver for receiving radio wave signals from the positioning satellites and converting these signals into position data. Other machine mounted sensors are used to detect crop conditions, such as crop moisture and yield. By combining this information the farmer is able to generate detailed maps of field conditions. The farmer can then take these maps and better control inputs, such as seed, fertilizer and other chemicals.

In yield mapping the farmer maps the output or yield of the field. Typically, a GPS receiver and a mass flow sensor would be mounted to an agricultural combine. The mass flow data is combined with the GPS data to form a yield map. U.S. Pat. No. 5,343,761 discloses a combine mounted mass, flow sensor which is located in the transition housing between the paddle elevator and the loading auger for the clean grain tank. The sensor comprises an impact plate against which a portion of the clean grain is thrown by the paddle elevator.

SUMMARY

It is an object of the present invention to provide an improved mass flow sensor in which non-linear effects of the sensing mechanism are eliminated.

It is a feature of the present invention that the line of action of the impact plate is in line with the predominant direction of grain flow.

It is a feature of the present invention that the impact plate is sized to receive all of the grain thrown by the individual paddles of the paddle elevator.

It is another feature of the present invention that a potentiometer is used to provide an electric signal of impact force.

In processing a harvested crop, an agricultural combine threshes, separates and cleans the grain. After cleaning, the clean grain is received in a transverse auger that directs the grain to a paddle elevator. The paddle elevator lifts the grain upwardly to a transition housing where the grain is directed to a loading auger for the clean grain tank. An impact plate of a mass flow sensor is positioned in the transition housing so that the grain expelled by the paddle elevator is thrown against the impact plate. The impact plate is provided with an arm having an axis that is coincident with the predominant direction of grain flow. In this way frictional effects due to impact plate misalignment with the predominant direction of grain flow are eliminated.

The arm is coupled to a second frame member of a force measuring assembly. The first frame member of the force measuring assembly is coupled to the combine. Both frame members are parallel to one another. Two leaf springs extend between the first and second frame members at right angles to the frame members. The first frame member is provided with a first tongue and the second frame member is provided with a second tongue. A potentiometer is positioned between the two tongues to detect relative movement between the second frame member coupled to the impact plate arm, and the first frame member that is coupled to the combine. A potentiometer was used to improve long term reliability.

BRIEF DESCRIPTION OF THE DRAWINGS

FIGS. 3 and 4 are side views of the force measuring assembly.

DETAILED DESCRIPTION

Figure 1:
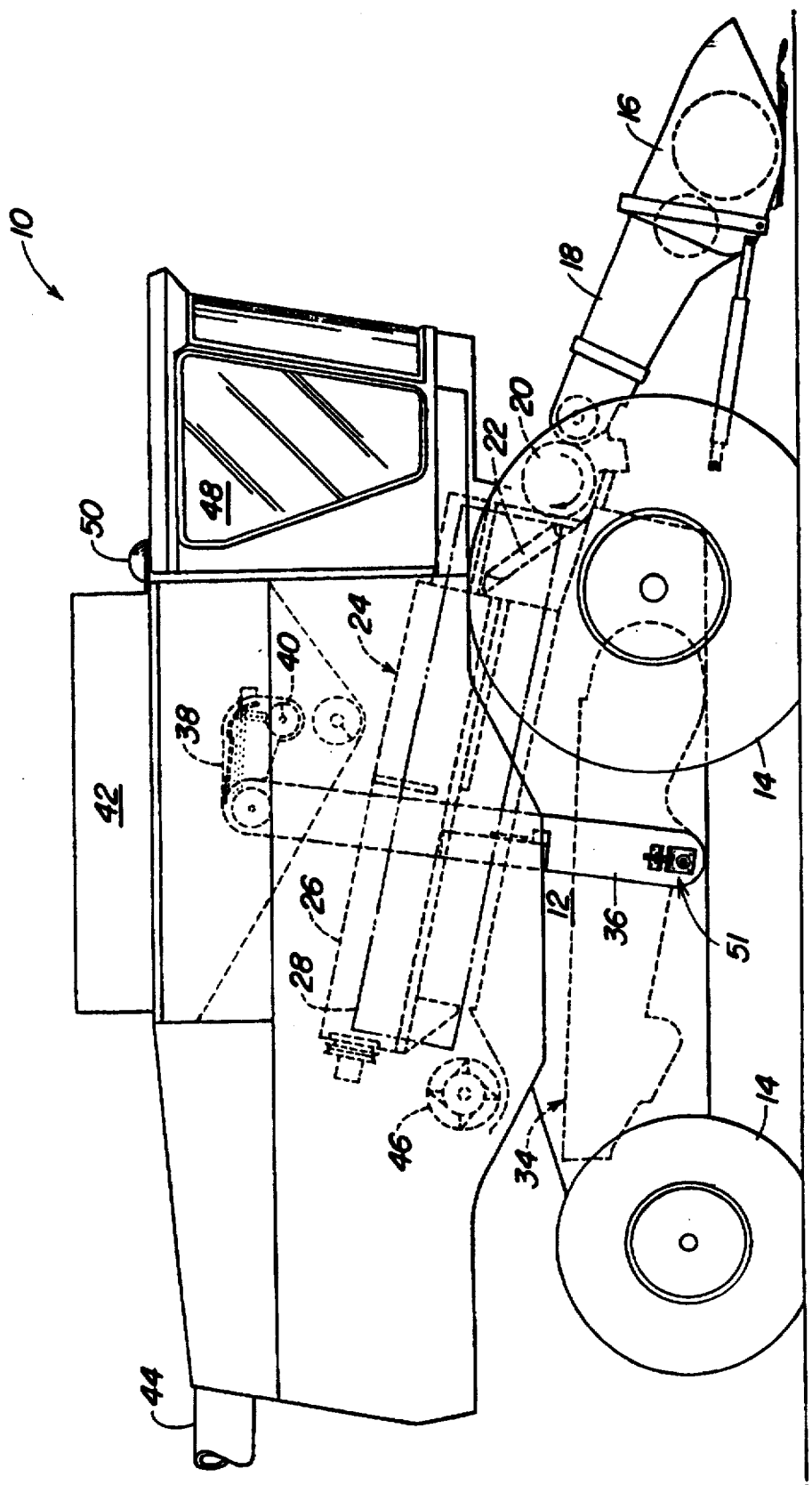
FIG. 1 is a semi-schematic side view of a combine.
Figure 2:
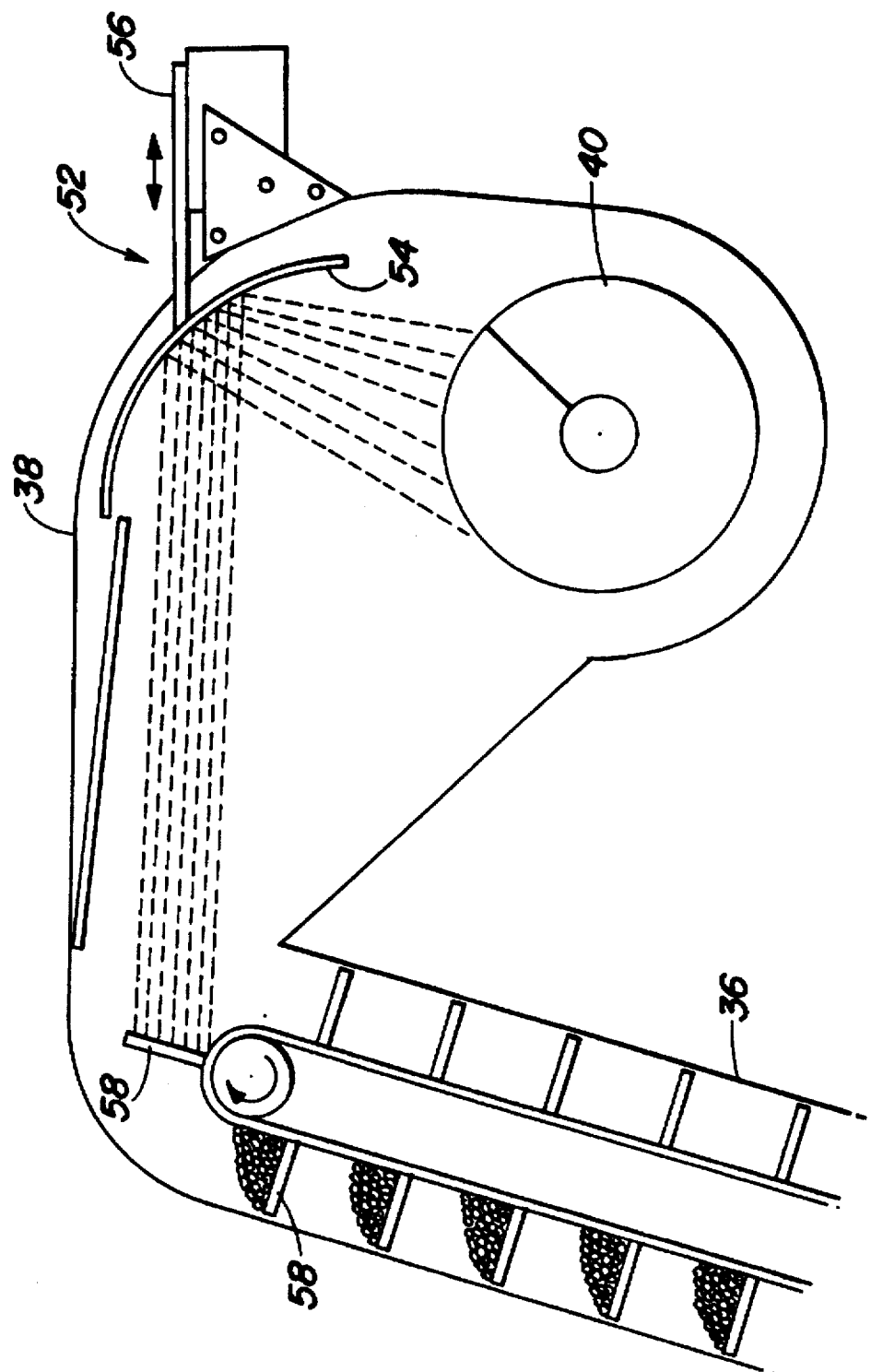
FIG. 2 is a close up view of the transition housing of the clean grain elevator.

FIG. 1 shows an agricultural combine 10 comprising a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24. The axial crop processing unit is located between the sidesheets of the combine. The sidesheets form part of the supporting structure. Although the invention is being described as being mounted on a rotary combine, it may also be used on other combines having a clean grain elevator, such as conventional straw walker machines.

The axial crop processing unit 24 comprises an axial rotor housing 26 and an axial rotor 28 located in the housing. The harvested crop enters the housing through the inlet transition section 22. The rotor is provided with an infeed portion, a threshing portion and a separating portion. The rotor housing has a corresponding infeed section, a threshing section and a separating section.

Both crop processing portions, the threshing portion and the separating portion, are provided with crop engaging assemblies. The threshing section of the rotor housing is provided with a concave and the separating section is provided with a grate. Grain and chaff released from the crop mat falls through the concave and the grate. The concave and grate prevent the passage of crop material larger than grain or chaff from entering the cleaning system 34.

As illustrated in FIG. 1, grain and chaff falling through the concave and grate is directed to cleaning system 34 which removes the chaff from the grain. The clean grain is collected by a transverse clean grain auger and is directed to paddle elevator 36. The paddle elevator 36 directs the grain upwardly to a transition housing 38 where the grain is supplied to a loading auger 40 for loading the clean grain tank 42. The grain is removed from the clean grain tank 42 by unloading auger 44. As the straw reaches the end of the crop processing unit it is expelled through an outlet to a beater 46. The beater propels the straw out the rear of the combine. The operation of the combine is controlled from operator's cab 48. A radio receiver 50 for receiving GPS signals is positioned over the operator's cab. Slack in the paddle elevator chain is adjusted by adjustment mechanism 51.

The grain mass flow sensor 52 of the present invention is mounted to the transition housing 38. The grain mass flow sensor 52 is provided with a curved impact plate 54 that is provided with an arm 56 that extends outwardly from the transition housing 38. It should be noted that for a number of years Deere combines have been provided with a curved wear plate which is identical in size shape and location to the curved impact plate 54. The impact plate replaces the wear plate so it does not interfere with the normal flow trajectory of grain thrown by the individual paddles 58. The impact plate 54, like the previous wear plate extends substantially across the full width of the transition housing and extends in length from top to bottom so that substantially all of the grain thrown by the individual paddles strikes the impact plate. In this way the impact of substantially all of the grain is sensed by the grain mass flow sensor 52.

The grain is thrown by the individual paddles 58 along a predominant line that is defined as the axis along which the centroid of the grain mass is thrown. The axis of arm 56 is coincident with the predominant line and therefore grain frictional effects on the impact plate are minimized.

A force measuring assembly 60 is mounted to the transition housing 38 by a first mounting stud 62 to first frame member 64. A parallel second frame member 66 is mounted to the arm 56 by a second mounting stud 68. The frame members 64 and 66 are coupled to one another by two leaf springs 70. The first frame member is provided with a first tongue 72 and the second frame member is provided with a second tongue 74. A potentiometer 76 is positioned between the two tongues for measuring relative movement therebetween. The first and second frame members 64 and 66 and the two leaf springs 70 define a hollow box in which is located the potentiometer 76. A potentiometer clamp 82 is used to hold the potentiometer in place together with the first and second tongues.

FIG. 3 shows the force measuring assembly at rest, that is no force is being applied to the impact plate. As such the leaf springs are not deformed. As a force is applied to the impact plate, as shown in FIG. 4, the leaf springs deform and the plunger 80 of the potentiometer is compressed by second tongue 74. The potentiometer emits an electric signal that is proportional to impact force acting on the impact plate.

The present invention should not be limited by the above-described embodiment, but should be limited solely by the claims that follow.

We claim:

1. An agricultural combine for harvesting, threshing, separating and cleaning an agricultural crop, the combine comprising:

a frame;

ground engaging means extending downwardly from the frame for supporting and propelling the combine;

a harvesting means mounted to the frame for harvesting an agricultural crop;

threshing and separating means mounted to the frame for threshing and separating the harvested agricultural crop;

cleaning means mounted to the frame for cleaning the threshed and separated agricultural crop;

a clean grain elevator for receiving the clean grain from the cleaning means and directing the clean grain to the a clean grain tank, the elevator is provided with a paddle elevator which lifts the clean grain from the cleaning means into a transition housing wherein the clean grain from the elevator is thrown outwardly from the elevator into the transition housing where it is received by a loading auger which directs the clean grain to the clean grain tank;

a grain mass flow sensor is positioned in the transition housing, the grain mass flow sensor is provided with an impact plate having an arm defining an axis that is coincident with the outwardly thrown clean grain, the arm of the impact plate is coupled to a force measuring assembly for measuring impact force of grain impacting on the impact plate and a potentiometer is coupled to the force measuring assembly for providing an electric signal of the impact force.

2. An agricultural combine as defined by claim 1 wherein the impact plate has a width that extends substantially across the transition housing, the impact plate has a length so that substantially all of the grain thrown by the paddle elevator impacts the impact plate.

3. An agricultural combine as defined by claim 2 wherein the force measuring assembly comprises a first frame member having a first mounting assembly for mounting the first frame member to a combine, and a second frame member being provided with a second mounting member for mounting the second frame member to the arm of the impact plate.

4. An agricultural combine as defined by claim 3 wherein the first and second frame members are parallel to one another.

5. An agricultural combine as defined by claim 4 wherein two leaf springs extend between the first and second frame member.

6. An agricultural combine as defined by claim 5 wherein the potentiometer is positioned between the first and second frame members for measuring lateral movement of the first frame member relative to the second frame member caused by grain impacting the impact plate.

7. An agricultural combine as defined by claim 6 wherein the first frame member and the second frame member are parallel to one another.

8. An agricultural combine as defined by claim 7 wherein the first and second leaf springs are parallel to one another.

9. An agricultural combine as defined by claim 8 wherein the first and second leaf springs are substantially perpendicular to the first and second frame members.

10. An agricultural combine as defined by claim 9 wherein the first frame member is provided with a first perpendicular tongue and the second frame member is provided with a second perpendicular tongue, both the first and second perpendicular tongues are parallel to the first and second leaf springs.

11. An agricultural combine as defined by claim 10 wherein the potentiometer is positioned between the first and second perpendicular tongues.

* * * * *